United States Patent [19]

Posner, Jr. et al.

[11] Patent Number: 5,824,916
[45] Date of Patent: Oct. 20, 1998

[54] SYSTEM FOR MEASURING THE VOLUME AND RATE OF FLOW OF A MEDIA

[76] Inventors: Paul H. Posner, Jr.; Clifford L. Schaefer, II, both of P.O. Box 26521, Benbrook, Tex. 76126

[21] Appl. No.: 773,385

[22] Filed: Dec. 26, 1996

[51] Int. Cl.⁶ .................................................. G01F 1/30
[52] U.S. Cl. ................................................... 73/861.77
[58] Field of Search ............................ 73/861.77, 861.74, 73/861.79, 215; 198/502.2, 502.4; 193/5, 4; 222/57, 59, 72; 250/222.1, 221, 223 R, 577

[56] References Cited

U.S. PATENT DOCUMENTS

| | | | |
|---|---|---|---|
| 3,513,444 | 5/1970 | Henderson et al. | 73/433 |
| 3,681,988 | 8/1972 | McNulty | 73/215 |
| 3,819,918 | 6/1974 | Hale | 235/151.3 |
| 4,010,857 | 3/1977 | Reim et al. | 198/502.2 |
| 4,149,412 | 4/1979 | Fish | 73/304 |
| 4,170,900 | 10/1979 | Ozawa | 73/424 |
| 4,335,618 | 6/1982 | Bucsky et al. | 73/861.56 |
| 4,406,548 | 9/1983 | Haws | 366/8 |
| 4,467,657 | 8/1984 | Olsson | 73/861 |
| 4,556,323 | 12/1985 | Elkin | 366/31 |
| 4,566,337 | 1/1986 | Smart | 73/861.56 |
| 4,655,370 | 4/1987 | Harrison | 73/861.77 |
| 4,773,029 | 9/1988 | Claesson et al. | 364/562 |
| 4,852,028 | 7/1989 | Korpela et al. | 364/567 |
| 5,063,776 | 11/1991 | Zanker et al. | 73/155 |
| 5,433,520 | 7/1995 | Adams et al. | 366/8 |
| 5,452,213 | 9/1995 | Ito et al. | 364/465 |
| 5,487,307 | 1/1996 | Landgren et al. | 73/803 |

*Primary Examiner*—George M. Dombroske
*Assistant Examiner*—Harshad Patel

[57] ABSTRACT

A flow level measuring device for measuring quantities from a moving source of material is disclosed. The flow level measuring device includes an Electronic Control Unit (ECU) (28), and the following ancillary components: a programmable display (32), a Motion Detector Assembly Group (MDAG) (25), and a Level Detector Assembly Group (LDAG) (23). These assembly groups detect horizontal and vertical displacement of a material stream, respectively, and encode the displacement data. The encoded data is sent to ECU (28), whereby the encoded data is processed according to an algorithm. The manipulated data is then transformed into a suitable data stream that can be displayed on a viewing screen or other suitable display device, providing real time volumetric measurements not available in the prior art.

19 Claims, 6 Drawing Sheets

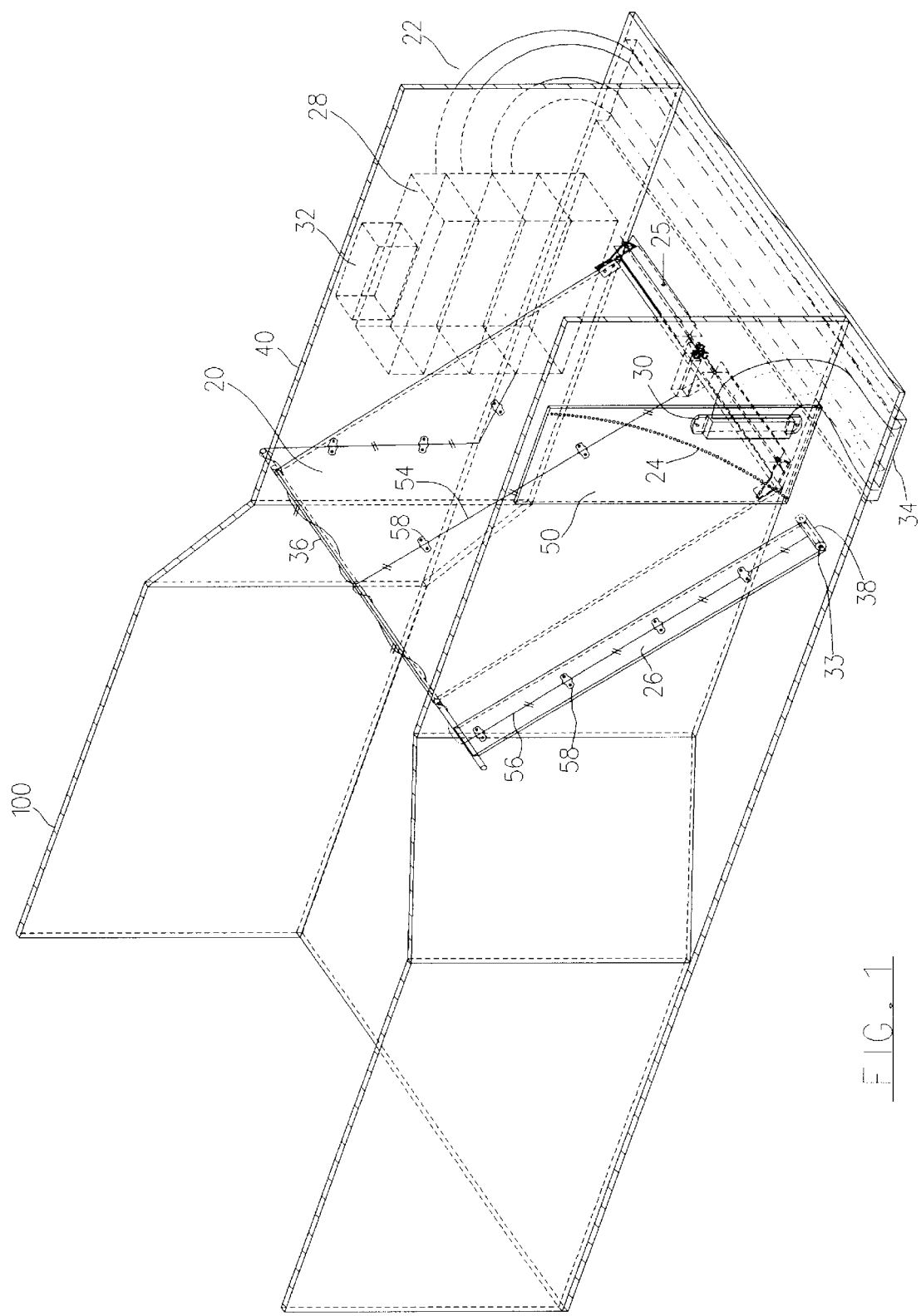

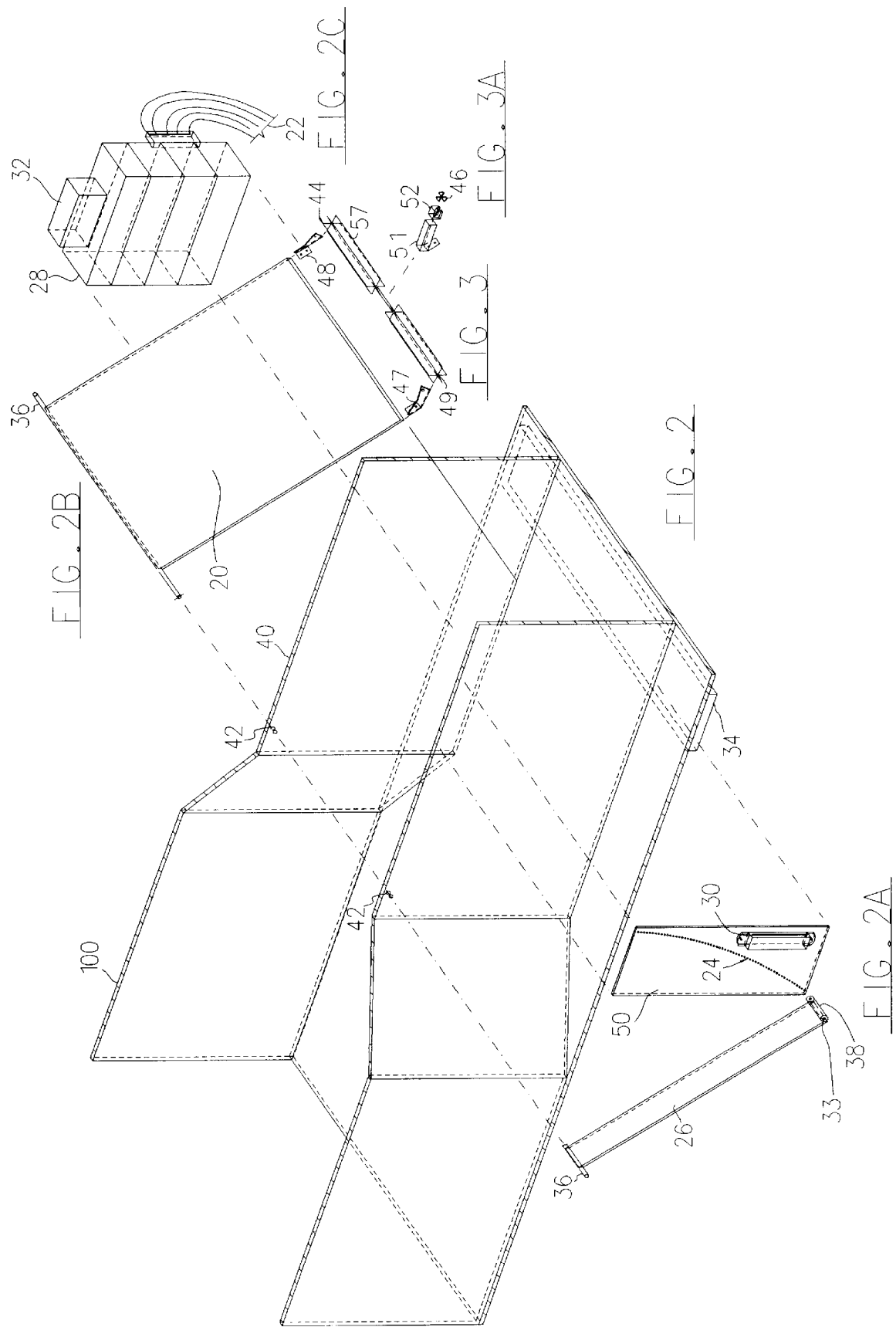

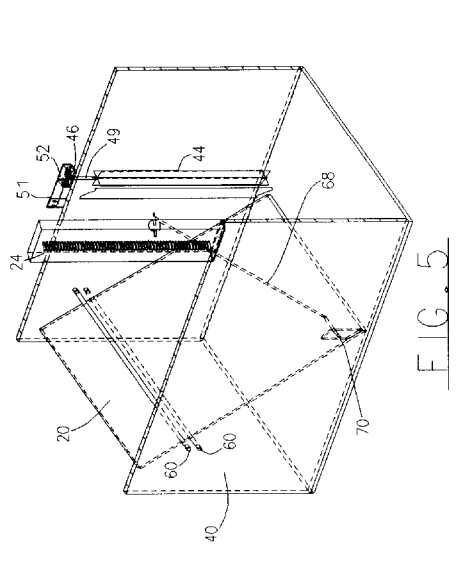
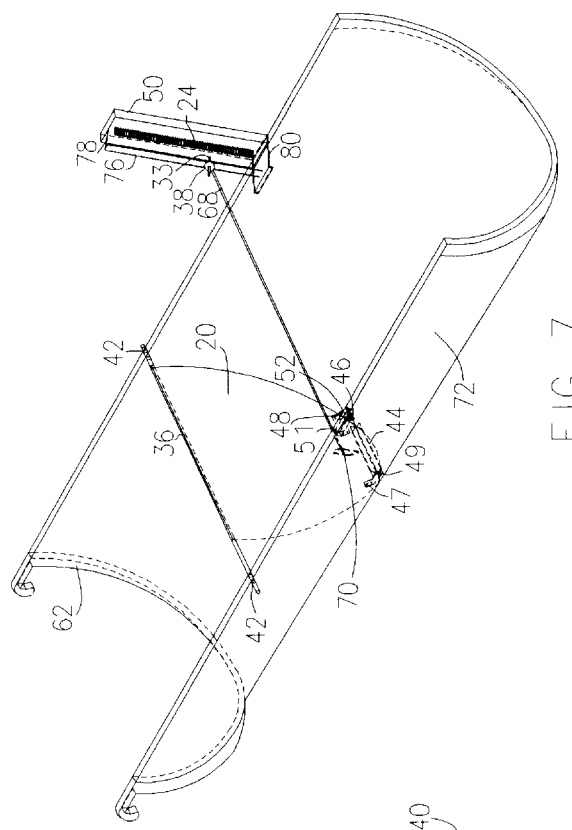
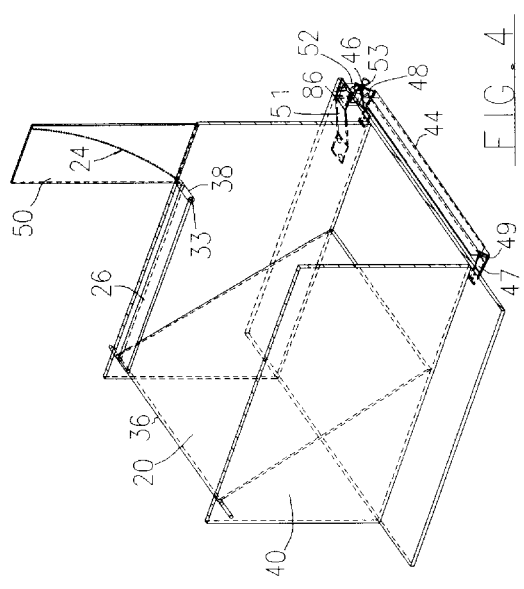
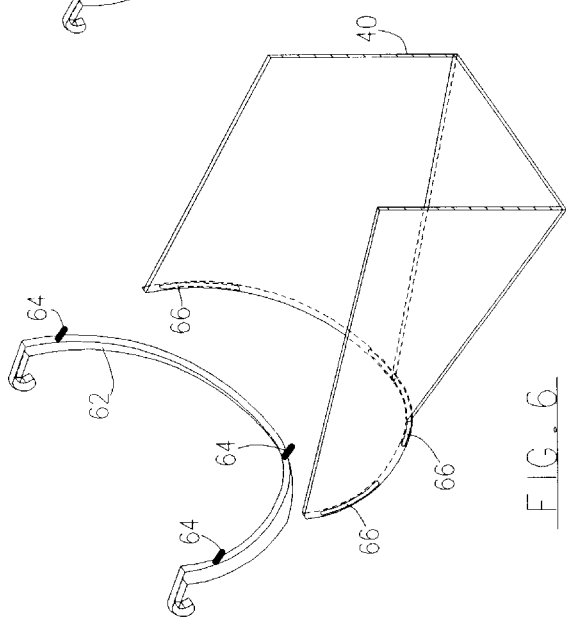

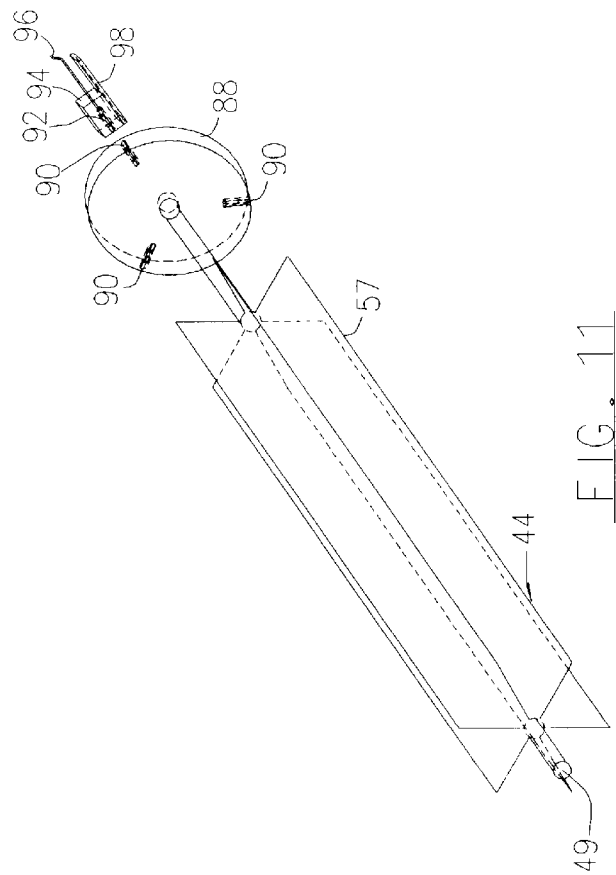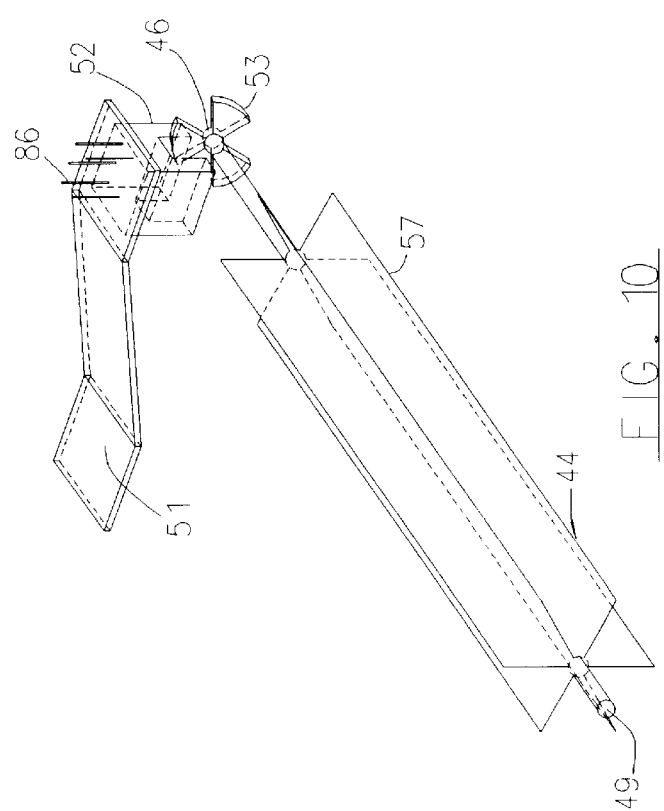

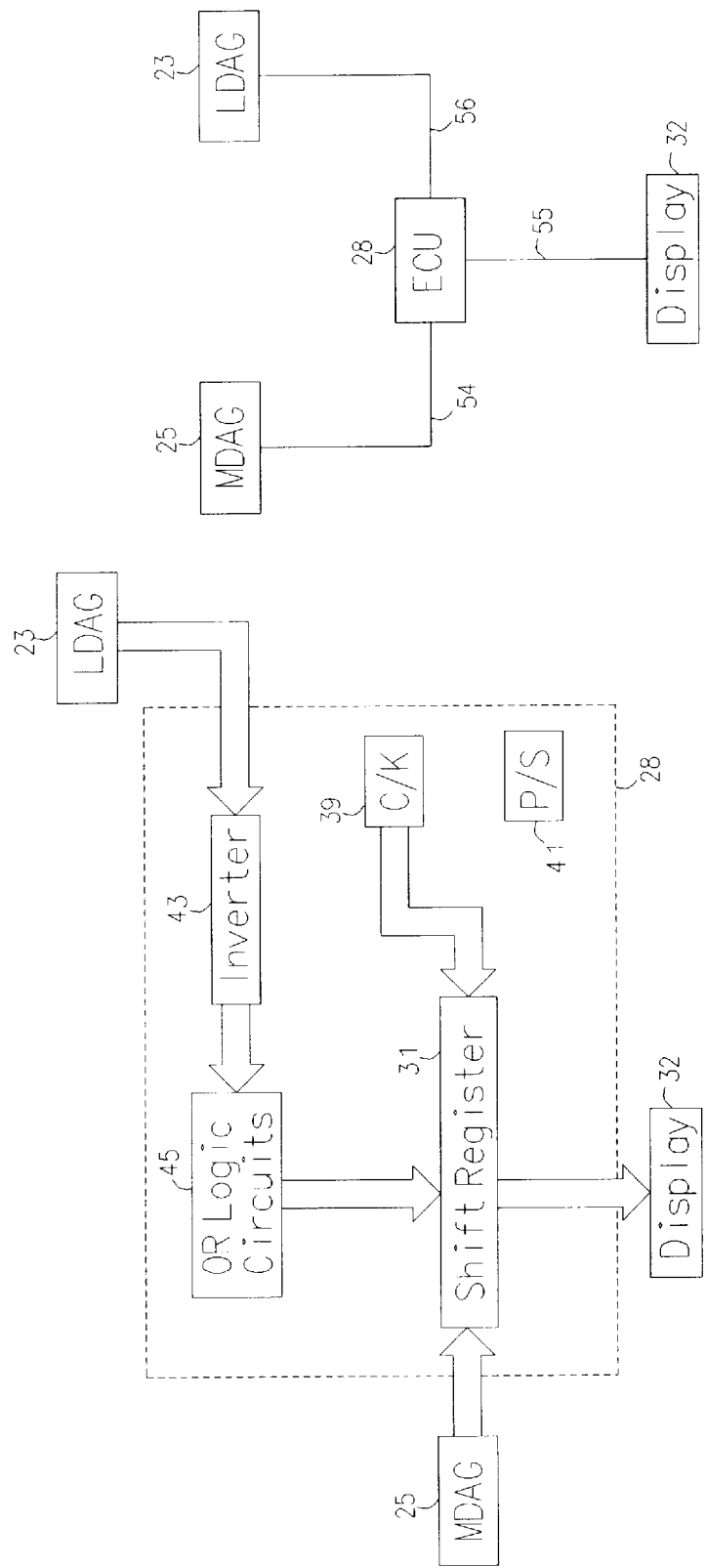

SYSTEM FOR MEASURING THE VOLUME AND RATE OF FLOW OF A MEDIA

BACKGROUND-FIELD OF INVENTION

This invention relates to volumetric measurement, specifically to a device that calculates volume and flow rate of a medium or material stream such as, an aggregate or slurry.

BACKGROUND-DESCRIPTION OF THE PRIOR ART

Concrete Mixers and the like are not equipped with a detachable direct reading volume measuring device. Consequently, consumers are unable to quickly verify the quantity of materials delivered to a job site, and are at the mercy of the supplier. Generally, this type of distribution equipment can carry approximately 9–10 yd$^3$ of material.

Concrete Mixers and other similar distribution equipment are loaded via a batch loading scheme and occasionally weighed. The problem with this method of measurement is that concrete sediment accumulates over time in the Concrete Mixer and thus, reduces the amount of fresh concrete that can be carried. Weighing the vehicle does not provide a reliable alternative, because the accumulated sediments that remain in the drum have hardened. Another problem with weighing the Concrete Mixer is the use of different mixes, having varying weights.

Unreinforced concretes made with stone or gravel is normally assumed to weigh 145 lb/ft$^3$. If the designer wishes to reduce the weight of concrete members, lightweight aggregates, made from a variety of expanded shales and slags, can be substituted for the heavier stone or gravel aggregates. This type of concrete is termed structural lightweight concrete and has an air-dry weight less than 115 lb/ft$^3$. If all aggregates (both the fine and the coarse) are lightweight, the concrete is called all-lightweight If the coarse aggregate is lightweight and the fine aggregate is sand, the concrete is termed sand-lightweight concrete. With all of the different mixes that can be loaded into a Concrete Mixer the most reliable volumetric measurement method would be located on the equipment's distribution apparatus.

Moreover, Concrete Mixers carry approximately 125 gallons of surplus water that can be added to the mix through a water inlet after the vehicle leaves the batch plant or used to clean-up the mixer and distribution apparatus after each use. The addition of water to the mix obviously increases the total volume, however; the strength and durability of the concrete and the workability are affected.

The strength and durability of the concrete are primarily influenced by the water-cement ratio. When the water-cement ratio is large, a dilute, high-shrinking, weak gel is produced. Concrete containing such gels is low in strength and lacks resistance to deterioration by weathering. To produce high quality concrete, sufficient water must be added to make the concrete fluid so it can be worked into all parts of the containing forms. A common field test used to control the workability and quality of the concrete is the slump test. Concretes are typically produced with slumps ranging from 2 to 6 inches.

For example, a structural engineer might specify the following minimum concrete requirements: 3000 psi 28-day compressive strength, 5-inch slump, no admixtures, and aggregate size no larger than 1.5-inches. Some of these requirements can be verified on the job site and others must be verified in a laboratory. Nonetheless, the only parameter that can not be adequately verified is the volume of concrete exiting the Concrete Mixer or the like, and concrete is sold by volume not by weight.

Inventors have created several types of volume measuring devices. U.S. Pat. No. 3,513,444 to Henderson (1970), U.S. Pat. No. 3,819,918 to Hale (1974) and U.S. Pat. No. 4,773,029 to Claesson (1988) disclose systems for determining the volume of cargo moving along a given path. The calculation of volume is realized by measuring the height and width of each incremental distance of an object moving down a conveyor at the instant a shadow is cast upon the photosensors. This configuration would not perform adequately in an environment, such as with concrete, because the photosensors would be coated with concrete and rendered useless. Also Claesson requires a velocity meter, which is inherently inaccurate in measuring concrete flow due to the wide range of elements in the concrete.

U.S. Pat. No. 5,063,776 to Zanker (1991) discloses a method of measuring fluid flow in a drilling rig return line with an ultrasonic transceiver. This system requires temperature sensors to correct speed of sound fluctuations. Flow-out determinations are then calibrated against the flow-in measurements by detecting mud pump strokes. A similar requirement in U.S. Pat. No. 4,467,657 to Olsson (1984) also utilizes a pump unit to determine the speed of flow of a medium. The medium is pumped from a pump unit to effect working cycles that are proportionalized to determine the amount of flow or speed of flow. U.S. Pat. No. 4,556,323 to Elkin (1985) discloses a cement mixing and distribution apparatus that includes metering wheel assembly that requires a power actuated auger to drive an auger shaft. Air voids are created in the material being metered, of an auger actuated system. Therefore, this method is inaccurate for determining volume. This system also requires a hammer mechanism to vibrate against the inner surface of a cylindrical drum to remove built-up cement. Pumps, power actuated augers, power driven hammers, and temperature compensation are too costly and are unnecessary for portable units. Portable units must be as light as possible to facilitate quick installation and removal from each vehicle.

OBJECTS AND ADVANTAGES

It is therefore an object of the invention to provide an improved method and system for the measurement of a media that is significantly more accurate than prior art methods and provides the measurements in real time while connected to a distribution apparatus, such as a Concrete Mixer chute.

This invention relates to a measuring system and, more particularly, to a measuring system arranged to measure the height, width, and length of a media including means for determining the volume of the media.

Accordingly, it is a principle object of the present invention to provide an improved means of obtaining the height width, and length measurements of a media and combining these measurements to obtain and determine the volume of the media.

It is another object of the invention to provide an improved apparatus and method for obtaining or computing the volume of a material stream.

It is another object of the invention to provide a means for obtaining the height, width, and length measurements, of a material stream moving through a distribution apparatus, and combining these measurements to obtain the volume of the material stream.

It is still a further object of the invention to provide a novel means and method of computing the volume of a moving material stream wherein given increments of the height and length of a material stream are measured and multiplied with the width of a selected increment and whereby the volume measurements are summed to provide the total volume of a material stream.

It is another object of the invention to provide a means of obtaining the volume of a moving material stream at high speed or varying speed.

A still further object of the present invention is to provide a device useful in determining the volume of a material stream including improved circuitry for combining and multiplying data derived from a photosensitive system or magnetic system outside of the material stream to obtain the volume of the material stream.

Another object of the invention is to obtain the volume of a material stream with a high degree of accuracy.

Another object of the invention is to provide an apparatus that is durable enough to handle the extreme harsh environment associated with abrasive materials, and can be quickly removed and installed on various distribution apparatuses.

An advantage of the invention is that a pump or other mechanical means is not required to move the material stream through the apparatus.

Another advantage of the present invention is that directly sensing the velocity of the material stream is unnecessary to measure volumetric flow.

Still further objects and advantages will become apparent from a consideration of the ensuing description and drawings.

DRAWING FIGURES

In the drawings, closely related figures have the same number but different alphabetic suffixes.

FIG. 1 is a perspective view of one embodiment of the invention illustrating the channel and receiver section with its associated components.

FIG. 2 is an exploded view of the separate assemblies.

FIG. 2a and 2b are exploded views of the level detector assembly group.

FIG. 2c is a schematic view of the ECU and programmable display.

FIG. 3 and 3a are exploded views of the motion detector assembly group.

FIG. 4 is a perspective view of another embodiment of the invention illustrating the motion detector assembly group and level detection assembly group.

FIG. 5 is a perspective view of another embodiment of the invention where the motion sensor is vertical and the sensor array is vertical.

FIG. 6 is an exploded view of one embodiment of the collar and receiving section.

FIG. 7 is a perspective view of another embodiment of the invention using a curved channel section.

FIG. 10 is a perspective of the motion detector assembly group in the preferred embodiment.

FIG. 11 is a perspective of the motion detector assembly group in another embodiment.

FIG. 12 is a block diagram of the electrical subassemblies.

FIG. 13 is a schematic representation of the ECU and ancillary components.

Figure 9:
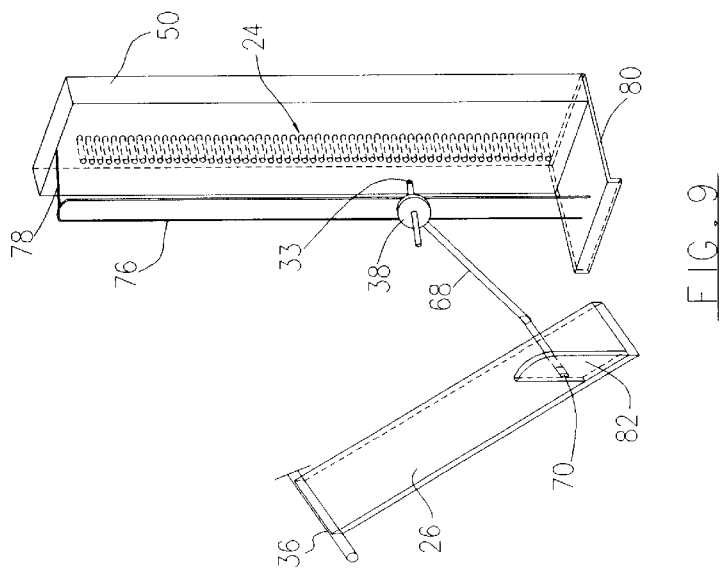
FIG. 9 is a pictorial view of the emitter arm and sensor array in another embodiment.

| Reference Numerals In Drawings | |
| --- | --- |
| 20 flap | 22 cable |
| 23 level detector assembly group | 24 sensor array |
| 25 motion detector assembly group | 26 emitter arm |
| 28 ecu | 30 array connector |
| 31 shift register | 32 display unit |
| 33 emitter | 34 raceway |
| 36 shaft | 38 emitter assembly |
| 39 clock | 40 channel |
| 41 power supply | 42 hole |
| 43 inverter | 44 distance sensor |
| 45 "or" logic | 46 encoder |
| 47 left bracket | 48 right bracket |
| 49 shaft | 50 housing |
| 51 support bracket | 52 slotted switch |
| 53 tab | 54 cable |
| 55 cable | 56 cable |
| 57 appendages | 58 cable clip |
| 60 arbor | 62 collar |
| 64 bolt | 66 slot |
| 68 lever | 70 pin |
| 72 curved channel section | 74 photodetector |
| 76 guide | 78 standoff |
| 80 mounting bracket | 82 hub |
| 86 lead | 88 disk |
| 90 magnet | 96 wire |
| 98 holding bracket | 100 receiver section |

SUMMARY

In accordance with the present invention an apparatus comprises of a mounting collar and receiver section, a channel, an ECU, a level detector assembly group, a motion detector assembly group, and a display.

DESCRIPTION-FIGS. 1 to 13

A typical embodiment of the measuring system of the present invention is illustrated in FIG. 1 and FIG. 2. The measuring system has a receiver section 100 consisting of vertical side members and a flat horizontal member that is wider on one end and necks down on the other end. A channel 40 is dimensioned so that a fixed width is constant throughout the section and is connected to receiver section 100. In the preferred embodiment, receiver section 100 has a collar 62 that attaches with bolts 64 into slot 66. However, different collars may be utilized so that a proper connection with various distribution apparatuses can be facilitated.

A flap 20 is connected to a shaft 36 that is supported by the vertical sides of channel 40 via holes 42. Connected to the other end of flap 20 are two brackets, a left bracket 47 and a right bracket 48. These brackets support a motion sensor 44 which is embodied in FIG. 3. Motion sensor 44 comprises a removable shaft 49 with appendages 57, that can be of various shapes and sizes. In FIG. 3A, an encoder 46 is supported by removable shaft 49 and is located in the center of motion sensor 44, for this embodiment A slotted switch 52 is mounted on support bracket 51 which is securely fastened to flap 20.

FIG. 1 and FIG. 2 show an electrical connection to a slotted switch 52 by a cable 54 where a series of cable clips 58 secure cable 54 to flap 20. Cable 54 terminates at an ECU 28 (electronic control unit). An emitter assembly 38 is secured to an emitter arm 26 which is rotated by shaft 36. An electrical connection is made to emitter assembly 38 by a cable 56 that is securely fastened to emitter arm 26 by cable clips 58. Cable 56 terminates at ECU 28. A sensor array 24 is mounted into a housing 50 which is secured to channel 40. An array connector 30 is mounted to housing 50 where an electrical connection is made by a cable 22. Cable 22 is routed through a raceway 34 and terminates at ECU 28.

Figure 8:
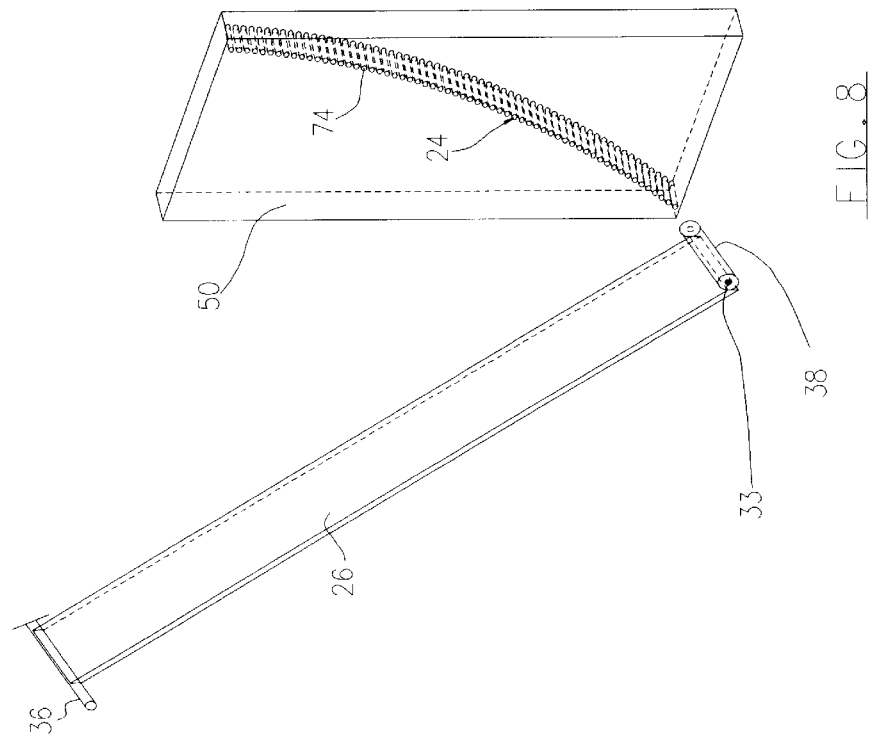
FIG. 8 is a pictorial view of the emitter arm and sensor array in the preferred embodiment.

In FIG. 8 a preferred embodiment of a portion of the level detector assembly group is illustrated, whereby sensor array 24 mirrors the arc path of flap 20. Sensor array 24 is made up of a series of a photodetector 74. The spacing of photodetector 74 in the preferred embodiment is uniform along the arc path of flap 20. Other spacings can be accommodated, such as illustrated in FIG. 5 and FIG. 9. Photodetector 74 detects infrared light emitted by emitter assembly 38 which is electrically connected to array connector 30.

A preferred embodiment of the motion detector assembly group is illustrated in FIG. 3 and FIG. 10. The motion detector assembly group comprises motion sensor 44, with appendages 57 that can be of various shapes and sizes, encoder 46, left bracket 47, and right bracket 48. Attached to shaft 49 is encoder 46. Encoder 46 has a series of tabs 53 uniformly spaced in a circular orientation. Tab 53 actuates slotted switch 52 by breaking an infrared beam within slotted switch 52. Another embodiment of the motion detector assembly group is illustrated in FIG. 11. A disk 88 contains a series of uniformly spaced magnets 90 that actuate switch 92 at a fixed distance. Switch 92 is electrically connected to ECU 28 by wire 96. Other similar sensing mechanisms can be employed, as will be evident by reading the operation section.

FIG. 13 shows a block diagram of the major electronic subassemblies utilized in the present invention. A Motion Detector Assembly Group (MDAG) 25 connects to ECU 28 via cable 54 and a Level Detector Assembly Group (LDAG) 23 connects to ECU 28 via cable 56. The (MDAG) 25 is a horizontal sensing group and the (LDAG) 23 is a vertical sensing group. A programmable display 32 connects to ECU 28 via cable 55. FIG. 12 illustrates the internal components that make up ECU 28. LDAG 23 connects to ECU 28 where an inverter 43 interfaces the input signal to a OR logic 45. OR logic 45 and MDAG 25 interface, respectively, to shift register 31. Shift register 31 interfaces the output signal to display 32 via cable 55. A timing clock 39 provides a variety of clock speeds to shift register 31. A power supply 41 provides a variety of voltage types and ranges that are required by all of the electronic components.

Other embodiments of the present invention are illustrated in FIG. 4, FIG. 5, and FIG. 7. Different configurations can be employed with varying combinations of the aforementioned assemblies. For example, FIG. 4 employs the MDAG on the end of the channel section and FIG. 1 employs the LDAG on the side of the channel section whereby a curved sensor array mirrors the arc path of the flap. This particular array utilizes infrared photodetectors. On the other hand, the array could consist of many different implementations such as: magnetic sensors, electrical contactors, laser diodes, fiber optics and the like. FIG. 6 substitutes a particular mounting collar with hooks in place of the receiver section. Other mounting collars have studs or other means for mounting to various distribution apparatuses. FIG. 10 employs a slotted switch and a three tab encoder and a finned motion sensor. Another variation could be an eight or twelve tab encoder and a cylindrical motion sensor with a helical ridge instead of fins. A mechanical or magnetic switch could be substituted for the slotted switch or a proximity switch, etc. would work as well. FIG. 12 shows a display for the ECU output device. Another output device or combination of output devices could be a computer, computer monitor, hard drive or other recording device, a radio transceiver, a modem or satellite uplink. The different combinations allow the present invention to accommodate various distribution apparatuses with a higher degree of volumetric and flow level measurement accuracy.

OPERATION-FIGS. 1, 4, 6

The preferred embodiment utilizes mounting collar 62 to quickly connect to a distribution apparatus, such as the end of a Concrete Mixer chute. This connection also allows our invention to be rotated, while mounted to a distribution apparatus, so that a level orientation can be achieved. When a Concrete Mixer dispenses concrete the chute is normally sloped downward at an angle to allow the material to gravity flow to a desired location. The kinetic energy of the moving material is sufficient enough to operate our invention without the aid of mechanical pumps or other means.

Media enters into our invention through channel 40 (preferred embodiment) which can be made out of several different kinds of material, such as gauge steel, aluminum, plastic, or other durable material. A high impact plastic, however, is desirable because of its durability and lightweight, and is economical to manufacture. It is paramount that channel 40 be rigid and maintain its shape because the width of the channel is used to establish one known dimension (width) for the volume calculation.

Even though the present invention can measure completely dry materials, concrete and the like contain water. Water or humid environments can swell and warp wood or rust unprotected metal surfaces. Over time this can result in inaccurate volumetric measurements. In addition to that, the present invention is designed to be lightweight so it can be quickly connected and disconnected from various distribution apparatuses. The type of material that the distribution apparatus is constructed out of will not adversely affect a portable unit because the connection is only temporary and will be removed after each use. However, permanently affixed measuring units will likely require channel 40 to be manufactured out of a similar material to avoid electrolysis or other adverse reactions.

When a mixer is ready to unload the concrete out of the rotating drum to a job site, the chute is lowered and positioned for access by the workers. Additional chute sections are normally added to the main chute, to make the chute longer. Material flowing down the mixers chute, conforms to the elliptical shape of the chute. When material enters into channel 40 the material conforms to the new rectangular shape and thus forces flap 20 to rise to the current height of the material stream (the beginning of vertical sensing) passing under the lower edge of flap 20. The lower edge of flap 20 travels along an arc with a fixed radius due to the connection to shaft 36. As material moves down and out of channel 40 a motion sensor 44 detects the presence of the material stream (the beginning of horizontal sensing) and is forced to rotate about shaft 49. Rotating shaft 49 moves encoder 46 in a circular path that is designed to break an infrared beam, in slofted switch 52, by a series of uniformly spaced tabs 53. The spacing of tab 53 sets the length dimension for the volume calculation.

When the infrared beam is broken an asynchronous signal is transmitted to ECU 28 which enables the count sequence to being. The count sequence utilizes a data stream initiated by LDAG 23. LDAG 23 comprises: flap 20, shaft 36, emitter arm 26, emitter assembly 38, sensor array 24, array connector 30, cable 56 and cable clips 58. As flap 20 moves along a fixed arc path, shaft 36 simultaneously rotates emitter arm 26 on a duplicate arc path. The vertical height of the material stream is captured at the start of the count sequence. This level is determined, in part, by photodetector 74 and emitter 33 whereby a representative signal is transmitted to ECU 28. Motion sensor 44 only rotates when a material stream is moving through channel 40, and flap 20 is raised upward. When these conditions are met an asynchronous signal enables ECU 28 to begin processing a data stream that is representative of the vertical height of a single photodetector 74 within sensor array 24.

FIG. 1 illustrates array connector 30 whereby cable 22 interfaces the sensor array to ECU 28. Cable 22 in the preferred embodiment is a 64 pin ribbon cable that provides individual connections to each photodetector as well as a common ground connection. The type of cable or the number of possible connections varies with each application. Several different types of cable can be substituted for ribbon cable 22 as long as a good electrical connection can be established. Cable 22 is routed through a protective raceway 34 to prevent snagging or mishandling of the cable out in the field.

The count sequence begins when ECU 28 receives an asynchronous input signal into shift register 31 from MDAG 25. This input signal occurs when tab 53 breaks the beam of slotted switch 52. Each vertical measurement corresponds to an individual photodetector 74 currently sensing emitter 33. Simultaneously, vertical measurement data, obtained from LDAG 23, is connected to inverter 43. Inverter 43 is the primary interface for this connection and then the signal is routed to OR logic 45 and finally to shift register 31. Shift register 31 transforms the input information into a useful digital format for programmable display 32. The number of pulses generated to programmable display 32 is dependent upon which photodetector 74 is currently biased. Programmable display 32 has many capabilities that can be tailored for each particular application, such as: single counter, dual counter, single counter with rate indication or dual counter with rate indication.

Incoming pulses are received into display 32 and are multiplied by a count scale factor. The internal count value keeps track of the scaled input pulse count which results in the desired reading value for the count display. The scaled input is programmed by dividing the desired display units by the number of pulses and multiplying that result by a decimal point position factor. A scaled input is a method of calculation that multiplies a scaling factor to each incoming pulse to give a desired measurement unit.

CONCLUSION, RAMIFICATIONS, AND SCOPE OF INVENTION

Accordingly, the reader will see that a volumetric measurement device that can be easily connected to a distribution apparatus and display the results in a specific unit of measure is invaluable. In addition, the present invention does not require a pump or other mechanical means to move the material stream through the apparatus and does not require directly sensing the velocity of the material stream to measure volumetric flow.

Another embodiment of the present invention can be a non-portable measuring device to handle bulk material. This is a similar device to the aforementioned portable unit, except a larger unit that has a special support base to accommodate the size and weight of the larger unit as well as the increased weight of the material to be measured. The components would essentially be the same except larger and more durable for the intended purpose.

Other embodiments of the present invention would include an elliptical receiving section instead of a rectangular section. The advantage of this shape would allow manufactures of elliptical distribution apparatuses, such as concrete chutes, to produce identical receiver sections.

Many different configurations are possible with the present invention such as, locating the sensor array and emitter arm on the side of the unit, as opposed to the top of the unit This configuration provides a more compact unit that can be easily handled by a single operator. Also, side covers could be utilized to provide an added degree of protection to sensitive components. The motion sensor can be mounted to the flap or to the channel section, depending on the media being measured.

On the other hand, error checking and redundant component assemblies can be facilitated to achieve greater accuracy. By duplicating, for example, the sensor array and/or motion sensor a slight improvement in the measurement resolution would be achieved. Furthermore, redundant component assemblies provide greater reliability if a failure should occur on one of the measuring components.

The electronic control unit could utilize either microcontrollers or microprocessors to provide more versatility and make upgrading simpler. The motion sensor could be replaced with a circular drive belt with ridges, in which, a moving material stream would urge the drive belt The drive belt would also serve as the horizontal member of the channel section.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

We claim:

1. A measuring system, comprising:
   (a) a channel to enable media to move through said measuring system,
   (b) an attaching means for conjoining said measuring system with various distribution apparatuses,
   (c) a plurality of pivotably moving rigid surfaces to allow said measuring system to be actuated by said moving media,
   (d) a rotatably mounted apparatus with a plurality of circumferential appendages to enable said measuring system to detect said moving media,
   (e) a first transducer means to detect vertical displacement of said moving media, and a second transducer means to detect horizontal displacement of said moving media,
   (f) an assimilating means for a plurality of data inputs and outputs, wherein said plurality of data inputs are received from said first and second transducer means, respectively,
   (g) a display means for displaying a volume and a rate of flow, whereby an operator can select different functions or parameters.

2. The measuring system of claim 1 wherein said channel has perpendicular and parallel enclosures made of a durable material to resist abrasion.

3. The measuring system of claim 2 wherein said channel has a fixed width, whereby a dimensional unit can be obtained.

4. The measuring system of claim 1 wherein said first and second transducer means utilizes a sensor array and an encoder, respectively.

5. The measuring system of claim 4 wherein said sensor array uses photodetectors, whereby a single dimensional unit can be obtained.

6. The measuring system of claim 3 wherein said rotatably mounted apparatus further includes said encoder for determining a single dimensional unit.

7. The measuring system of claim 6 wherein said encoder has a plurality of said appendages evenly spaced circumferentially, whereby said appendages actuates said second transducer means.

8. The measuring system of claim 4 wherein said rigid surfaces comprises a flap means for detecting a material stream, a lever arm means for supporting an emitter, and an arbor, whereby, said rigid surfaces are conjoined.

9. The measuring system of claim 8 wherein said flap means supports said rotatably mounted apparatus and said encoder means.

10. The measuring system of claim 1 wherein said rotatably mounted apparatus has fins extending radially outward, whereby a material stream urges said fins.

11. The measuring system of claim 1 wherein said attaching means is an adjustable collar with hooks, studs or brackets.

12. The measuring system of claim 11 further includes an interchangeable attaching means to conjoin distribution apparatuses of miscellaneous shapes and sizes, whereby, a quick connection or disconnection can be facilitated.

13. The measuring system of claim 1 wherein said rotatably mounted apparatus is cylindrical with raised helical ridges, whereby said material stream urges said raised helical ridges.

14. The measuring system of claim 1 further includes a leveling means, whereby said attaching means can be rotated to a level orientation.

15. The measuring system of claim 1 wherein said plurality of data inputs and outputs utilizes a shift register means and a supporting circuitry.

16. The measuring system of claim 15 wherein said shift register means and said supporting circuitry generate a pulse stream.

17. The measuring system of claim 1 wherein said means of displaying data is a programmable display unit.

18. The measuring system of claim 17 wherein said programmable display unit said plurality of data pulses outputs to cubic dimensions and rate of flow.

19. A method for measuring a volume and a rate of flow of media, comprising:

(a) providing a channel for said media to flow through said channel, (b) positioning a pivotably moving rigid surface to be raised and lowered by said media, (c) converting said positioning of said pivotably moving rigid surface to an electrical signal by a first transducer means, (d) providing a rotatably mounted apparatus means with a plurality of circumferential appendages to detect said moving media through a rotational movement, (e) converting said rotational movement of said rotatably mounted apparatus means to an electrical signal by a second transducer means.

(f) providing an assimilating means for a plurality of data inputs and outputs, wherein said plurality of data inputs are received from said first and second transducer means, respectively, (g) providing a display which is operatively connected to said assimilating means for displaying said volume and said flow rate, (h) providing an attaching means so an operator can quickly connect or disconnect said channel from a distribution apparatus.

* * * * *